(12) United States Patent
Tamizkar

(10) Patent No.: US 11,671,359 B2
(45) Date of Patent: Jun. 6, 2023

(54) METHODS AND APPARATUSES IN A NETWORK COMPRISING A PLURALITY OF SWITCH DEVICES

(71) Applicant: Telia Company AB, Solna (SE)

(72) Inventor: Babak Tamizkar, Stockholm (SE)

(73) Assignee: TELIA COMPANY AB

( * ) Notice: Subject to any disclaimer, the term of this patent is extended or adjusted under 35 U.S.C. 154(b) by 74 days.

(21) Appl. No.: 17/372,939

(22) Filed: Jul. 12, 2021

(65) Prior Publication Data

US 2022/0045947 A1 Feb. 10, 2022

(30) Foreign Application Priority Data

Aug. 7, 2020 (SE) ..................... 2050939-4

(51) Int. Cl.
*H04L 45/00* (2022.01)
*H04L 43/10* (2022.01)
*H04L 45/74* (2022.01)

(52) U.S. Cl.
CPC .............. *H04L 45/66* (2013.01); *H04L 43/10* (2013.01); *H04L 45/74* (2013.01)

(58) Field of Classification Search
None
See application file for complete search history.

(56) References Cited

U.S. PATENT DOCUMENTS

| 7,149,794 | B1 | 12/2006 | Attili et al. |
| 7,577,136 | B1 | 8/2009 | Devanagondi et al. |
| 11,329,917 | B2* | 5/2022 | Tamizkar ............... H04L 45/18 |
| 2004/0218542 | A1 | 11/2004 | Lee |
| 2005/0053006 | A1 | 3/2005 | Hongal et al. |
| 2007/0036161 | A1 | 2/2007 | Mahamuni |
| 2014/0328343 | A1* | 11/2014 | Kapadia ............... H04L 45/741 370/392 |
| 2016/0226762 | A1* | 8/2016 | Zhang ................... H04L 49/354 |

(Continued)

FOREIGN PATENT DOCUMENTS

WO WO 2008/003218 A1 10/2008

OTHER PUBLICATIONS

European Extended Search Report, dated Jan. 4, 2022, European Patent Office. Application No. 21187332.8-1215.

(Continued)

*Primary Examiner* — Xavier S Wong
(74) *Attorney, Agent, or Firm* — Burr & Forman LLP; Jeffrey H. Kamenetsky

(57) ABSTRACT

A method performed by a switch device including receiving, from a source host node, a frame including a MAC address of the source host node as a source MAC address; a MAC address of a destination host node as a destination MAC address, and information indicating a type of frame as a request frame; sending the frame towards the destination host node; generating a first reply frame including the MAC address of the source host node and information indicating a type of frame as a reply frame, the information indicating in a source MAC address field of the first reply frame including a switch ID, a sequence number equal to 0, a hop number equal to 1, and incoming port information that the switch device uses to forward at least one frame towards the source host node; and sending the generated first reply frame towards the source host node.

14 Claims, 5 Drawing Sheets

(56) References Cited

U.S. PATENT DOCUMENTS

2020/0252426 A1* 8/2020 Lee .................. H04L 63/168
2020/0314692 A1* 10/2020 Mittal ................ H04W 76/10

OTHER PUBLICATIONS

Connectivity Fault Managment, Norman Finn, IEEE 802.1 Tutorial, Portland, Jul. 12, 2004, Cisco.com.
Swedish Search Report, dated May 4, 2021, Swedish Patent and Registration Office, Application No. 2050939-4, filed Aug. 7, 2020.
International Telecommunications Union, G.8013/Y.1731 (Aug. 2015), Series G: Transmission Systems and Media, Digital Systems and Networks—Packet over Transport aspects—Ethernet over Transport aspects. Series Y: Global Information Infrastructure, Internet Protocol Aspects and Next-Generation Network.

* cited by examiner

METHODS AND APPARATUSES IN A NETWORK COMPRISING A PLURALITY OF SWITCH DEVICES

TECHNICAL FIELD

The present disclosure relates to the field of data communications, and in particular to methods, and apparatuses in the form of switch devices and host nodes for tracing a path between a source host node and a destination host node in a network.

BACKGROUND

In routing technologies, a method to trace a route between a source host node and a destination host node is known as Traceroute. A packet or a frame that is sent from source node in a packet network generally traverses multiples devices or nodes in the network to reach its destination node. Traceroute enables to trace the route that the packet or frame takes through the network. Traceroute enables the determination and display of the Layer 3 (L3) path (route) between a source host node and a destination host node in a network. As a result, one determines the routers, their IP (Internet Protocol) addresses and their order between the source and the destination. Traceroute can be run by an end user or a network administrator either in a host node or in any intermediate device/router.

Implementation of the Traceroute technique in a routing environment comprising a plurality of routers is easily achievable. For example, having such a tool in L3 is possible using the capability of TTL (Time To Live) field in a L3 packet (or frame). However, the TTL field in not retrievable for a Layer 2 (L2) frame, i.e., in a switching environment, comprising L2 switch devices that works on the data link layer ((Open Systems Interconnection) OSI L2). Hence, there are no techniques in L2 to determine a path between a source and a destination. This means that it is not currently possible to determine, in an easy way, what switch devices are placed between a source node and a destination node. This has the drawback that it is not possible to perform a L2 troubleshooting.

One way to determine a path in a switching environment is to have a network administrator login to a first connected switch device and run commands to find a second switch device, and then login to the second switch device and run commands to find a third switch device and so on. This is cumbersome and time consuming in a switching environment, especially if the switching environment include many switch devices.

There is therefore a need for new methods and apparatuses for tracing a path between a source host node and a destination host node in a network comprising a plurality of L2 switch devices, that require less consumption of resources, achieve fast tracing of packets through the network and avoiding to login into each switch device.

SUMMARY

According to an aspect of embodiments herein, there is provided a method performed by a switch device in a network comprising a plurality of switch devices, the method comprising: receiving, from a source host node, a frame including a Medium Access Control (MAC) address of the source host node as a source MAC address; a MAC address of a destination host node as a destination MAC address, and information indicating a type of the frame as a request frame; sending the received frame towards the destination host node; generating a first reply frame including the MAC address of the source host node as a MAC destination address, and information indicating a type of the frame as a reply frame, wherein the information, indicated in a source MAC address field of the first reply frame, includes a switch ID of the switch device, a sequence number with a value equal to 0, a hop number with a value equal to 1, and an incoming port information that the switch device uses to forward at least one frame towards the source host node, and sending the generated first reply frame towards the source host node.

According to another aspect of embodiments herein, there is provided a switch device in a network comprising a plurality of switch devices. The switch device comprises a processor and a memory containing instructions executable by the processor wherein the switch device is configured to perform the subject-matter disclosed herein.

According to another aspect of embodiments herein, there is provided a method performed by a host node in a network comprising a plurality of switch devices, the method comprising: transmitting, to a switch device, a frame including a MAC address of the source host node as a source MAC address; a MAC address of a destination host node as a destination MAC address, and information indicating a type of the frame as a request frame; receiving a reply frame, from the switch device, said reply frame including the MAC address of the source host node as a MAC destination address, and information indicating a type of the frame as a reply frame, wherein the information indicated in a source MAC address field of the reply frame includes a switch ID Identification) of the switch device, a sequence number with a value equal to 0, a hop number with a value equal to 1, and an incoming port information that the switch device uses to forward at least one frame towards the source host node, and fetching the hop number, the switch ID and the incoming port information.

According to another aspect of embodiments herein, there is provided a host node in a network comprising a plurality of switch devices. The host node comprises a processor and a memory containing instructions executable by the processor wherein the switch device is configured to perform the subject-matter disclosed herein.

An advantage with embodiments herein is that less consumption of resources is used since the method used does not require login into each switch device for tracing a route between a source host node and a destination host node.

Additional advantages achieved by the present disclosure will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
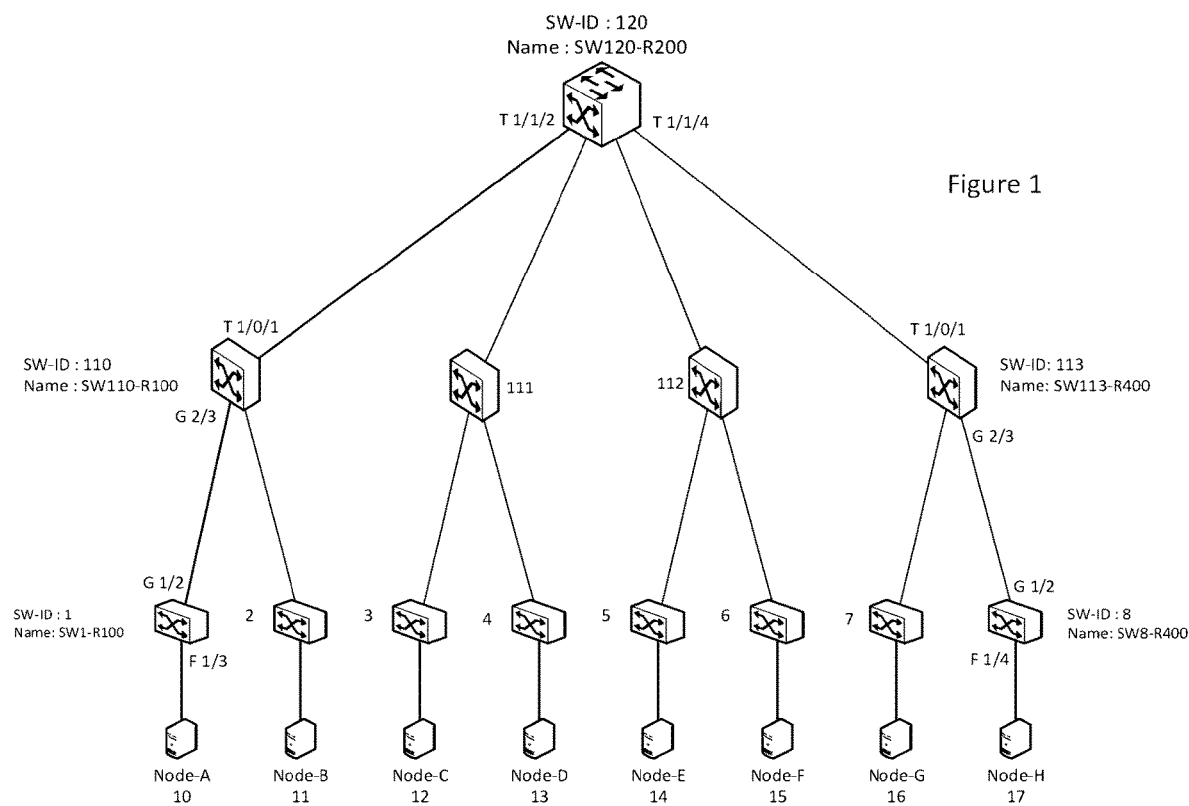
FIG. 1 is an example of a network topology wherein embodiments of the present disclosure may be employed.

Referring to FIG. 1, there is illustrated an example of a network wherein embodiments herein may be employed. As shown the network comprises a plurality of switch devices 1-8, 110-113, and 120, and a plurality of host nodes 10-17. It should be mentioned that the network may include any number of switch devices and host nodes and also other types of network devices, such as routers, gateways, etc.

Assuming that in the L2 domain, host node Node-A 10 and host node Node-H 17 wish to communicate with each other. As shown, there are switch devices in-between through which frames or packets or traffic pass. Using the solution according to the present disclosure, enables determining which switch devices that are placed between the source host node and the destination host node; the order of the switch devices, the incoming and outgoing interfaces or port information of each switch device and additional information as will be described in greater detail.

Each switch device is assigned a switch identification (SW-ID), which may be assigned manually or automatically. For example, the switch devices may negotiate with each other to retrieve the switch IDs. The switch-ID of each switch device is indicated in FIG. 1. Each switch device may further have a name as shown in FIG. 1. For example Switch device 1 has SW-ID 1 and a switch name SW1-R100. Switch device 2 has SW-ID 2 and a switch name SW2-R200, etc. The SW-ID may be between 1 and 255, which is more than enough in a network in an L2 domain. It should be mentioned that the SW-ID is not restricted to this range.

According to an embodiment, host node Node-A 10, hereinafter referred to as source host node, transmits a (data) frame or a data packet including a MAC address of the source host node Node-A 10, a MAC destination address of a destination host node (here assumed to be Node-H 17) and an information indication of the type of the frame as a request frame.

The source host node Node-A 10 may be provided with the MAC destination address of destination host node Node-H 17, e.g., due to an earlier communication with the destination host node. Alternatively, if the source host node Node-A 10 does not have the MAC destination address of Node-H 17, Node-A 10 may send an Address Resolution Protocol (ARP) request frame towards Node-H 17 to retrieve the MAC destination address from an ARP reply frame from Node-H 17.

In case Node-A 10 sends an ARP request frame, each switch device in between Node-A 10 and Node-H 17, including SW-1, SW-110, SW-120, SW-113 and SW-8 will receive the ARP request and will update their MAC address tables for Node-A 10 and Node-H 17. In other words, by sending an ARP request, the MAC address table of the switch devices are updated with Node-A's MAC address and by sending the ARP reply, the MAC address table of the switch devices are updated with Node-H's MAC address.

Only those switch devices through which the traffic of the ARP request frame and the ARP reply frame passes update their MAC address table. Those switch devices that have both Node-A and Node-H's MAC address in their MAC address table are referred to here as Transit Switch devices. In our example switch devices SW-1, SW-110, SW-120, SW-113 and SW-8 are Transit Switch devices. Below are shown the updated MAC address tables of each of these Transit Switch devices.

| SW-ID: 1 | |
|---|---|
| MAC Address Table | |
| Port | MAC Address |
| F1/3 | AA:AA:AA:AA:AA:AA |
| G1/2 | HH:HH:HH:HH:HH:HH |

| SW-ID: 110 | |
|---|---|
| MAC Address Table | |
| Port | MAC Address |
| G2/3 | AA:AA:AA:AA:AA:AA |
| T1/0/1 | HH:HH:HH:HH:HH:HH |

| SW-ID: 120 | |
|---|---|
| MAC Address Table | |
| Port | MAC Address |
| T1/1/2 | AA:AA:AA:AA:AA:AA |
| T1/1/4 | HH:HH:HH:HH:HH:HH |

| SW-ID: 113 | |
|---|---|
| MAC Address Table | |
| Port | MAC Address |
| T1/0/1 | AA:AA:AA:AA:AA:AA |
| G2/3 | HH:HH:HH:HH:HH:HH |

| SW-ID: 8 | |
|---|---|
| MAC Address Table | |
| Port | MAC Address |
| G1/2 | AA:AA:AA:AA:AA:AA |
| F1/4 | HH:HH:HH:HH:HH:HH |

As an example, the MAC source address of source host node Node-A 10 is given by AA:AA:AA:AA:AA:AA; and the MAC destination address of destination host node Node-H 17 is HH:HH:HH:HH:HH:HH. It should be noted that these are only examples of MAC addresses.

As shown above, each table also include information on port information. For example, for Switch device 1, the incoming port information is F1/3 used to receive the frame from Node-A 10 and G1/2 the port information used to receive the reply frame from Node-H 17. The port information of the other Transit Switch devices is also depicted in the tables above and in FIG. 1.

Irrespective on how the source host node Node-A 10 retrieves the MAC destination address of Node-H 17, source host node Node-A 10, transmits a (data) frame or a data packet including the MAC address of the source host node Node-A 10, a MAC destination address of the destination host node Node-H 17 and an information indicating a type of the frame as a request frame.

Figure 6:
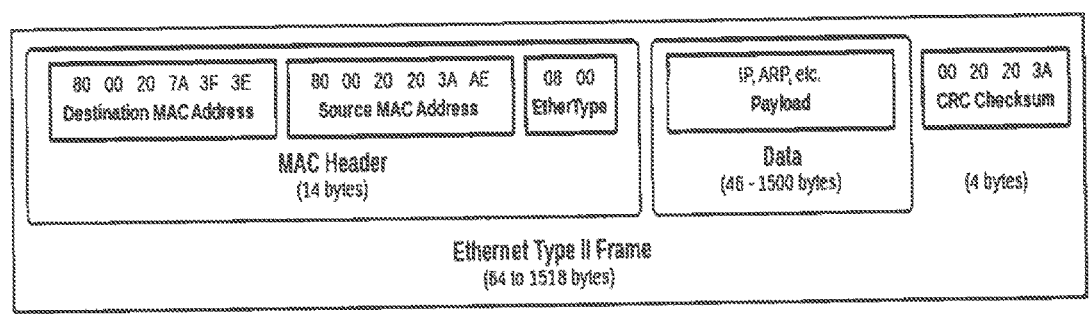
FIG. 6 illustrates a standard Ethernet frame.

There are two types of data frames that the present disclosure makes use of. A Request frame and a Reply frame. Both represent different values in the frame to show the type of the frame. These values are placed into an EtherType field of the frame.

standard Ethernet frame is shown in FIG. 6.
The frame includes:
1. L2 part (Frame header): This part itself includes three other parts.
   a. Destination MAC address (6-Byte)
   b. Source MAC address (6-Byte)
   c. Ethernet Type (2-Byte) or EtherType 2. L3 part (Network header): This part includes Source and destination IP address and data. It is called a Payload.
3. CRC (Cycling Redundancy Check) sum As previously mentioned, a switch device is a L2 device. It means, a switch device reads only the frame header, while a router is a L3 device which can read the network header as well.

EtherType is a two-octet field in the Ethernet frame. It is used to indicate which protocol is encapsulated in the payload of the frame. For example, an EtherType value of 0x0800 signals that the frame contains an IPv4 datagram. Likewise, an EtherType of 0x0806 indicates an ARP frame, 0x86DD indicates an IPv6 frame and 0x8100 indicates the presence of an IEEE 802.1Q tag.

According to the present embodiments, the information indicating the type of the frame is included in the frame sent by Node-A 10, as a request frame, and as will be described, the information indicating the type of the frame, as a reply frame is included in the frames generated by the switch devices.

As EtherType is two-octet field it is a number between 0-65535. One may choose two numbers within this range which is not used and define in the switches and in the host nodes.

1) Request Frame Format

The request frame that Node-A 10 sends to the switch device may have the following format:

| Frame header | | | |
|---|---|---|---|
| Destination MAC | Source MAC | EtherType | Payload |
| HH:HH:HH:HH:HH:HH | AA:AA:AA:AA:AA:AA | "Request" | 0 |

As shown, the source and destination MAC address fields are indicated by the MAC address of the Node-A 10 and the MAC address of the destination node Node-H 17, respectively. The EtherType field indicates that it is a "Request" frame.

It should be noted that there is need to have data in the payload for the purpose of the present disclosure although data can be included in the frame. The request frame is sent towards the destination host node Node-H 17.

2) Reply Frame Format

When a switch device, e.g., switch device 1 receives the request frame, the switch device needs to reply to this frame. As previously explained, a switch device reads the L2 part of the frame. In a first step the switch device sends the request frame towards the destination with no change and as a second step the switch device generates a reply frame and indicates in the EtherType of the frame that it is a reply frame and includes the MAC address of Node-A 10 in the destination MAC address field of the frame. Below is shown a format of the reply frame:

| Frame header | | | |
|---|---|---|---|
| Destination MAC | Source MAC | EtherType | Payload |
| AA:AA:AA:AA:AA:AA | | "Reply" | 0 |

As will be explained, additional information is included by the switch device in the reply frame. The switch device generates several reply frames.

The switch device may include information such as incoming port information, outgoing port information, Switch-ID, switch name, hop number, sequence number, etc. The switch device includes one or more of the above information in the source MAC address field of the frame. When the reply frame is sent to Node-A 10, this node looks at the EtherType and determines that it is a "Reply" frame and then looks at the Source MAC address field to fetch the necessary data it needs.

Before explaining how a switch device modifies the source MAC address field, let's have a look at a structure of the MAC address field. A Standard MAC address is a unique 48-bit data which is divided to two 24-bit part. The first 24-bit part is a unique ID assigned by IEEE to each manufacture of NIC (Network Interface Controller). It is known as OUI (Organizationally Unique Identifier). The second 24-bit is assigned by each vendor internally. This part is vendor locally significant. A combination of these two 24-bit make the MAC address unique in whole world.

In order to have a meaningful information, we need to agree on a format on both the sender side and receiver side.

Note: Reply frame has two different types of the frame:

Reply_Port-Info

Reply_Name-Info a) Reply_Port-Info: This frame basically is designed to carry the switch port information.

The following is an example of how the source MAC address's bits are divided in different fields to carry information in each section. By having such a structure, a receiver also knows how to read the source MAC address field to get or fetch the necessary information.

| Reply_Port-Info field format (48-bit of source MAC Address) | | | | | | | | |
|---|---|---|---|---|---|---|---|---|
| Info (3-Bytes) | | | | | | Data (3-Bytes) | | |
| 8-bit SW ID | 3-bit Seq No. | 1-bit Flag | 4-bit Rsvd | 5-bit Hop No. | 3-bit Int Type | 8-bit Module No 1 | 8-bit Module No 2 | 8-bit Port No |
| 0-255 | 0-1 | 0/1 | | 0-31 | 0-7 | 0-255 | 0-255 | 0-255 |

SW ID (Switch ID) Sender's Switch ID of the frame. It is a number between 0-255.

Seq No. (Sequence Number): It is a 3-bit number. Later we will explain how switch sends several Reply frames to the requester. Each frame includes different information. Sender uses this sequence number to keep the order of the received frames to know what information should be fetched.

The first reply frame (with sequence number equal to 0) includes the incoming port information (or number) of the switch where the request frame arrives or the information that the switch device uses to forward at least one frame towards the source host node. A switch device retrieves this information from its own MAC address table.

The second replay frame (with sequence number increased to 1) includes outgoing port information (or number) of the switch where frame gets out from toward destination host node. The switch device also retrieves this information from its own MAC address table. It should be mentioned that the switch device does no fill in the hop number field here.

Flag: This is a 1-bit data that can be 0 or 1. As long as a sender switch device sends the information to the requester, this field is set to 0. But a switch device sets this flag to 1 for the last Reply frame to show the requester that this is the last Reply frame.

Hop No.: It shows the hop number of the switch device. For instance, in our example the hop number of switch device 1 is 1, the hop number of switch device 110 is 2, the hop number of switch device 120 is 3, and so on.

Int Type (Interface Type): It shows the type of the incoming/outgoing interface of the switch device. Depending on the interface type (original bandwidth) we assign following values:

100 Mb (Fast Ethernet): 0
1 Gb (Gigabit Ethernet): 1
10 Gb (Ten Gigabit Ethernet): 2
40 Gb: 3
Port-Channel (Bundle of more than one interface): 4
Reserve for other port type options: 5, 6, 7

Module No 1 & 2: These two data fields show the module number of the switch where the frame arrives or send out. If these fields are set to "255" it means, there is no module.

Port No: It shows the port number of the switch where the frame arrives or send out.

b) Reply_Name-Info

The following is an example of how the source MAC address's bits are divided in different fields to carry information in each section. By having such a structure, a receiver also knows how to read the source MAC address field to collect or fetch the necessary information.

As shown, this frame has more or less the same structure as Reply_Port-Info frame. But there are some differences:

There is neither "Hop No" nor "Int Type". These two fields are merged as a single byte to show a character from the switch name.

The last three bytes represents the additional characters of the switch name e.g., three characters of the switch name.

Seq No: Sequence number is between 2-7. So, when a requester receives a Reply with a Seq No. above 1 (2, 3, . . . 7), it is an indication that it is a frame with the information of the switch name. In this case, a requester looks at the last four bytes of the source MAC address field to fetch e.g., four characters of the switch name.

It should be mentioned that a switch name may be represented by any number of characters. Based on the sequence number field for the Reply_Name-info frame (e.g., a number between 2 and 7), a switch device may send six Reply_Name-inform frames. For example, each frame may have four bytes/characters (based on ASCII system) as data which means 24 bytes/characters (based on ASCII system).

ASCII system stands for American Standard Code for Information Interexchange. ASCII is a standard that assigns letters, numbers, and other characters in the 256 slots available in the 8-bit code. The ASCII decimal (Dec) number is created from binary, which is the language of all computers. As example, the lowercase "h" character (Char) has a decimal value of 104 (Decimal), which is "0110100" in binary, or "A" character (Char) has a decimal value of 33 (Decimal), which is "00100001" in binary.

As previously described, the source host node Node-A 10 generates and sends a Request frame which is exemplified below:

| Frame header | | | |
|---|---|---|---|
| Destination MAC | Source MAC | EtherType | Payload |
| HH:HH:HH:HH:HH:HH | AA:AA:AA:AA:AA:AA | Request | 0 |

When switch device 1 receives this frame from Node-A 10, the switch device 1 checks the Ethertype field of the frame which provides information indicating a type of the frame. As shown, this is a request frame. Switch device 1 checks its MAC address table to determine the outgoing port information for the destination MAC address field of the frame. As shown in FIG. 1, it is G1/2. The switch device 1 sends this request frame out from port G1/2 (with no change) towards destination host node Node-H 17. Switch device 1 needs to reply to Node-A 10. For this purpose, the switch device 1 generates a first reply frame by including the MAC

| Reply_Name-Info field format (48-bit of source MAC Address) | | | | | | | |
|---|---|---|---|---|---|---|---|
| Info (2-Bytes) | | | | Data (4-Bytes) | | | |
| 8-bit SW ID | 3-bit Seq No. | 1-bit Flag | 4-bit Rsvd | 8-bit Switch name Char 1 | 8-bit Switch name Char 2 | 8-bit Switch name Char 3 | 8-bit Switch name Char 4 |
| 0-255 | 2-7 | 0/1 | | 0-255 | 0-255 | 0-255 | 0-255 | address of the source host node Node-A 10 as a MAC destination address, and information indicating a type of the frame as a reply frame, wherein the information, indicated in a source MAC address field of the first reply frame, includes a switch ID of switch device 1, a sequence number with a value equal to 0, a hop number with a value equal to 1, and an incoming port information that the switch device uses to forward at least one frame towards the source host node Node-A 10.

For example, switch device 1 may import the information in the source MAC address field of the reply frame. For example, switch device 1 fills the source MAC address field of the frame with following values. But before that the switch device does a MAC address table look up to see what the incoming port number towards Node-A is. It is F1/3 (see FIG. 1):

Info part:
    Switch-ID: 1
    Sequence No: 0
    Flag:0
    Hop No:1
    Interface Type: 0 (Fast Ethernet)
Data Part:
    Module No 1: 255 (No module No 1)
    Module No 1: 1
    Module No 1: 3

An example of a Reply_Port_Info field format is shown below:

| Reply_Port-info -No 1 | | | | | | | | |
|---|---|---|---|---|---|---|---|---|
| Reply_Port-Info field format | | | | | | | | |
| SW ID | Seq No. | Flag | Rsvd | Hop No. | Inte Type | Module No 1 | Module No 2 | Port No |
| 1 | 0 | 0 | 0 | 1 | 0 | 255 | 1 | 3 |

After preparation of this field, switch device 1 generates and sends the below (first reply) frame towards Node-A 10:

| Reply - Frame No 1: | | | |
|---|---|---|---|
| Frame header | | | |
| Destination MAC | Source MAC | EtherType | Payload |
| AA:AA:AA:AA:AA:AA | Reply_Port-Info | Reply | 0 |

In the next step, switch device 1 may provide Node-A 10 with outgoing port information that the switch device 1 uses to forward at least one frame towards the destination host node Node-H 17.

According to another embodiment, switch device 1 generates a second reply frame including the MAC address of the source host node (Node-A 10) as a MAC destination address, information including the switch ID, the sequence number which is increased by 1, and an outgoing port information that the switch device uses to forward at least one frame towards the destination host node (Node-H 17), and sends the generated second reply frame towards the source host node Node-A 10.

In detail, switch device 1 checks its MAC table and determines that the outgoing port information (or number) towards Node-H 17 is G1/2 (see FIG. 1). By having this information, a Reply_Port_Info field of the second reply frame may be presented as follows:

| Reply_Port-Info - No 2: | | | | | | | | |
|---|---|---|---|---|---|---|---|---|
| Reply_Port-Info field format | | | | | | | | |
| SW ID | Seq No. | Flag | Rsvd | Hop No. | Inte Type | Module No 1 | Module No 2 | Port No |
| 1 | 1 | 0 | 0 | 1 | 1 | 255 | 1 | 2 |

As shown above, the sequence number is increased from 0 to 1 (meaning that this is the second reply frame), the interface type field is set to 1 because it is G (1 Gigabit) and also the port number is set to 1 and 2 with no module No 1. Node-A 10 ignores the hop number field in this frame wherein the sequence number is equal to 1.

Switch device 1 includes the Reply_Port-Info field in the second reply frame and sends it towards Node-A 10.

The second reply frame is exemplified below:

| | | Reply_Name-Info field format (48-bit of source MAC Address) | | | | | |
|---|---|---|---|---|---|---|---|
| SW ID | Seq No. | Flag | Rsvd | Switch name Char 1 | Switch name Char 2 | Switch name Char 3 | Switch name Char 4 |
| 1 | 3 | 1 | | R | 1 | 0 | 0 |

| Reply - Frame No 2: | | | |
|---|---|---|---|
| Frame header | | | |
| Destination MAC | Source MAC | EtherType | Payload |
| AA:AA:AA:AA:AA:AA | Reply_Port-Info | Reply | 0 |

According to another embodiment, switch device 1 generates a third reply frame including the MAC address of the source host node (Node-A 10) as a MAC destination address, information including the switch ID, the sequence number which is further increased by 1, and information associated with a name of the switch device 1, and sends the generated third reply frame towards the source host node (Node-A 10).

In detail, switch device 1 generates the third reply frame and includes a Reply_Name-Info field format in the reply frame. The Reply_Name-Info field format is shown below

| | | Reply_Name-Info - No 3: Reply_Name-Info field format (48-bit of source MAC Address) | | | | | |
|---|---|---|---|---|---|---|---|
| SW ID | Seq No. | Flag | Rsvd | Switch name Char 1 | Switch name Char 2 | Switch name Char 3 | Switch name Char 4 |
| 1 | 2 | 0 | | S | W | 1 | — |

As shown, the sequence number is 2 as it has been increased by 1, which means this is the third reply frame. The flag is still 0 and the four bytes of the data parts are filled with four characters of the switch name of switch device 1.

The third reply frame is shown below:

| Reply - Frame No 3: | | | |
|---|---|---|---|
| Frame header | | | |
| Destination MAC | Source MAC | EtherType | Payload |
| AA:AA:AA:AA:AA:AA | Reply_Name-Info | Reply | 0 |

According to an embodiment, if the number of characters associated with the name of the switch device 1 is larger than a predetermined number of characters (e.g., 5, 6, 7, etc.), switch device 1 generates yet another reply frame (e.g., a fourth reply frame) including the MAC address of the source host node (Node-A 10) as a MAC destination address, information including the switch ID, the sequence number which is further increased by 1, and the information associated with the name of switch device 1, and sends said another reply frame towards the source host node (Node-A 10).

In the fourth reply frame, switch device 1 includes a Reply_Name-Info field as shown below:

| | | Reply_Name-Info field format (48-bit of source MAC Address) | | | | | |
|---|---|---|---|---|---|---|---|
| SW ID | Seq No. | Flag | Rsvd | Switch name Char 1 | Switch name Char 2 | Switch name Char 3 | Switch name Char 4 |
| 1 | 3 | 1 | | R | 1 | 0 | 0 |

As shown, the sequence number is equal to 3 (i.e., increased by 1), the switch ID is the same, but the Flag is changed to "1". This is because, in this example, the fourth reply frame is assumed to be the last reply frame generated by switch device 1. For example, the four bytes of data in this reply frame is filled with the rest of the switch name (R100). Recall that the name of switch device 1 is SW1-R100.

The fourth reply frame is shown below:

| Reply - Frame No 4: | | | |
|---|---|---|---|
| Frame header | | | |
| Destination MAC | Source MAC | EtherType | Payload |
| AA:AA:AA:AA:AA:AA | Reply_Name-Info | Reply | 0 |

Below is explained the actions performed by the source host node Node-A 10 when it is receives the reply frames.

When Node-A 10 receives the (first) reply frame, from switch device 1, said reply frame including the MAC address of the source host node (Node-A 10) as a MAC destination address, and information indicating a type of the frame as a reply frame, wherein the information indicated in a source MAC address field of the reply frame includes a switch ID of switch device 1, a sequence number with a value equal to 0, a hop number with a value equal to 1, and an incoming port information that the switch device uses to forward at least one frame towards the source host node. The source host node Node-A 10 fetches the hop number, the switch ID and the incoming port information.

For example, when the first reply frame arrives to Node-A 10, Node-A 10 looks at the EtherType field of the frame and sees it is "Reply". Node-A 10 fetches information. Node-A 10 looks at the sequence number to see what information is inside the Source MAC address field of the reply frame. Sequence Number is 0 then Node-A 10 knows it is a reply frame with the information on incoming port number of one of the transit switch devices that it had sent already the request to.

Based on the information received in the first reply frame, Node-A 10 starts to gather, collect or fetch information as shown below:

| Hop Number | Switch ID | Switch name | Incoming interface | Outgoing Interface |
|---|---|---|---|---|
| 1 | 1 | | F1/3 | |

As shown, the hop number is 1, the switch-ID is 1 and the incoming port information (or incoming interface) is F1/3.

According to an embodiment, when Node-A 10 receives another reply frame (e.g., the second reply frame with sequence number 1), including the MAC address of the source host node (Node-A 10) as a MAC destination address, information including the switch ID (SW-1), a sequence number which if it is equal to 1, the information further includes an outgoing port information that switch device 1 uses to forward at least one frame towards the destination host node Node-H 17. Node-A 10 then fetches the outgoing port information (which is G1/2). Node-A will ignore the hop number for this frame.

Hence, the following information that is fetched by Node-A 10 includes

| Hop Number | Switch ID | Switch name | Incoming interface | Outgoing Interface |
|---|---|---|---|---|
| 1 | 1 | | F1/3 | G1/2 |

According to an embodiment, when Node-A 10 receives yet another reply frame (third reply frame) including the MAC address of the source host node (Node-A 10) as a MAC destination address, information including the switch ID (SW-1), a sequence number which if it is larger than 1, the information further includes an information associated with a name of the switch device (SW1-) and Node-A 10 fetches the information associated with the name of the switch device. Here it is the third frame, so the sequence number is further increased by 1 and is thus equal to 2.

Because the sequence number is 2, Node-A 10 knows that the reply frame includes the name of switch device 1. In our example, Node-A fetches the first four characters of the switch name which are: "SW1-", as shown below:

| Hop Number | Switch ID | Switch name | Incoming interface | Outgoing Interface |
|---|---|---|---|---|
| 1 | 1 | SW1- | F1/3 | G1/2 |

According to an embodiment, when Node-A 10 receives yet another reply frame (the fourth reply frame) and since the number of characters associated with the name of the switch device (SW-1) is larger than a predetermined number of characters (in our example four characters), Node-A 10 fetches the information associated with the name of the switch device.

In our example, Node-A 10 knows that it is the last reply frame because the flag number is set to 1. When the fourth reply frame arrives, Node-A 10 reads the other characters of the switch name: "R100".

Below is shown the information that is fetched when all four frames arrive at Node-A 10.

| Hop Number | Switch ID | Switch name | Incoming interface | Outgoing Interface |
|---|---|---|---|---|
| 1 | 1 | SW1-R100 | F1/3 | G1/2 |

Hence, an output of all the necessary information that is fetched by Node-A 10 from the reply frames received from SW-1 may be presented as below:

| Output | |
|---|---|
| Source MAC address AA:AA:AA:AA:AA:AA | Destination MAC address HH:HH:HH:HH:HH:HH |

| Hop Number | Switch ID | Switch name | Incoming interface | Outgoing Interface |
|---|---|---|---|---|
| 1 | 1 | SW1-R100 | F1/3 | G1/2 |

As previously described, when switch device 1 receives the request frame from Node-A 10, switch device 1 sends the request frame towards the destination host node Node-H 17, with no change to the request frame.

Referring to FIG. 1, when switch device 110 receives this request frame, switch device 110 looks at the EtherType of the frame and sees it is a request frame. The procedure performed by switch device 110 is similar to the one performed by switch device 1. It means switch device 110 checks its MAC address table to determine the outgoing port information for the destination MAC address field of the frame and sends this request frame out from its outgoing interface (T1/0/1) towards Node-H 17 and also generates the reply frames towards Node-A 10. The process of generating and sending Reply frames is exactly same as what SW-1 does.

Switch device 1 receives a reply frame sent by switch device 110. Switch device 1 does not perform a MAC address learning for this reply frame. However, switch device 1 increases the hop number by 1. This is advantageous since each switch device generates a reply frame, regardless of its hop number, put "1" in the hop number field. But each switch device in the path between the source host node Node-A 10 and the destination host node Node-H 17 increases the hop number by 1. By doing so, the replay frame arrives at the source host node Node-A 10 with the actual hop number of the original switch sender.

In our example, when the reply frame generated by switch device 110 arrives at Node-A 10, the hop number is "2" which is the exact hop number of switch device 110. It is because the original hop number was 1 and switch device 1 increases it by 1.

Hence, according to an embodiment, when switch device 1 receives from another switch device 110 a reply frame including the MAC address of the source host node (Node-A 10) as a MAC destination address, and information indicating a type of the frame as a reply frame, wherein the information includes a switch ID of said another switch device 110, a sequence number; and wherein if the sequence number is equal to zero, switch device 1 increases the hop number indicated in the reply frame by 1; and switch device 1 sends the reply frame towards the source host node (Node-A 10). Switch device 1 also receives additional reply frames from switch device 110 with sequence number above 0, which are forwarded by switch device 1 towards Node-A 10 with no change.

Node-A 10 receives the reply frames from switch device 110 and start to fetch the information, as follows:

| Hop Number | Switch ID | Switch name | Incoming interface | Outgoing Interface |
|---|---|---|---|---|
| 2 | 110 | SW110-R100 | G2/3 | T1/0/1 |

When Node-A 10 puts all information together, the output is as follows:

| Output | | | | |
|---|---|---|---|---|
| Source MAC address AA:AA:AA:AA:AA:AA | | Destination MAC address HH:HH:HH:HH:HH:HH | | |
| Hop Number | Switch ID | Switch name | Incoming interface | Outgoing Interface |
| 1 | 1 | SW1-R100 | F1/3 | G1/2 |
| 2 | 110 | SW110-R100 | G2/3 | T1/0/1 |

Referring to FIG. 1, the next switch device to which the request frame arrives to is switch device 120. This request frame was sent by switch device 110 out from port T1/0/1. Switch device 120 looks at the EtherType of the frame and sees the information indicating the type of the frame and it is a request frame. The procedure performed by switch device 120 is the same as the one performed by switch device 110. This means that switch device 120 sends the request frame out from its port T1/1/4 towards Node-H 17. Switch device 120 also generates the reply frames in a similar way as switch device 110. Switch device 110 receives these reply frames sent by switch device 120. Again no MAC address learning is performed for a reply frame. Also, switch device 110 increases the hop number by 1 (for a reply frame having sequence number equal to 0) as previously described. So the hop number is 2 as it is increased by switch device 110. Switch device 110 sends the reply frame(s) out from interface G2/3 which is the path to reach Node-A 10. Switch device 1 receives the reply frame(s) and again there is no MAC learning and the hop number is increased by 1 for the frame with sequence number equal to 0. Now the hop number is equal to 3. Then switch device 1 sends the reply frames out from interface F1/3 which is the way out to reach Node-A 10. Node-A 10 receives these reply frames and starts to collect or fetch the information as previously explained. The result is shown below:

| Hop Number | Switch ID | Switch name | Incoming interface | Outgoing Interface |
|---|---|---|---|---|
| 3 | 120 | SW120-R200 | T1/1/2 | T1/1/4 |

The output at Node-A 10 for the three switch devices 1, 110 and 120 is shown below:

| Output | | | | |
|---|---|---|---|---|
| Source MAC address AA:AA:AA:AA:AA:AA | | Destination MAC address HH:HH:HH:HH:HH:HH | | |
| Hop Number | Switch ID | Switch name | Incoming interface | Outgoing Interface |
| 1 | 1 | SW1-R100 | F1/3 | G1/2 |
| 2 | 110 | SW110-R100 | G2/3 | T1/0/1 |
| 3 | 120 | SW120-R200 | T1/1/2 | T1/1/4 |

So far, we have the information about the three switch devices 1, 110 and 120.

As we continue, switch device 113 (see FIG. 1) receives the request frame sent by switch device 120 and checks the EtherType field of the frame indicating that is a request frame.

The process is then similar to the previously described process performed by switch devices 1, 110 and 120. It means switch device 113 sends the request frame out from its outgoing port interface (G2/3) towards Node-H 17 and also switch device 113 generates reply frames to be sent towards Node-A 10. Switch device 120 receives these reply frames sent by switch device 113. Again no MAC address learning for a reply frame. Switch device 120 increases the hop number by 1 for one of the reply frames which has sequence number equal to 0. So the hop number is now 2. Switch device 120 sends this reply frame out from interface T1/1/2 which is the way to reach Node-A 10. Switch device 113 also send the other reply frames as did switch device 1, switch device 110 and switch device 120 but with different information as previously described. Switch device 110 receives these reply frames and for one of the reply frames having the sequence number equal to 0, switch device 110 increases the hop number by 1. So the hop number is now equal to 3. Again, no MAC address learning for the reply frame(s). Then switch device 110 sends the reply frames (s) out from interface G2/3 towards Node-A 10.

Switch device 1 receives the reply frame(s) from switch device 110 and for one of the reply frames having the sequence number equal to 0, switch device 1 increases the hop number by 1. So the hop number is equal to 4. Then switch device 1 sends the reply frame(s) out from interface port F1/3 towards Node-A 10. Node-A 10 receives the reply frames which includes as EtherType "Reply" and start to collect or fetch the information from the received frames. The result is shown below:

| Hop Number | Switch ID | Switch name | Incoming interface | Outgoing Interface |
|---|---|---|---|---|
| 4 | 113 | SW113-R400 | T1/0/1 | G2/3 |

The output at Node-A 10 for the four switch devices is shown below:

| Output | | | | |
|---|---|---|---|---|
| Source MAC address AA:AA:AA:AA:AA:AA | | | Destination MAC address HH:HH:HH:HH:HH:HH | |
| Hop Number | Switch ID | Switch name | Incoming interface | Outgoing Interface |
| 1 | 1 | SW1-R100 | F1/3 | G1/2 |
| 2 | 110 | SW110-R100 | G2/3 | T1/0/1 |
| 3 | 120 | SW120-R200 | T1/1/2 | T1/1/4 |
| 4 | 113 | SW113-R400 | T1/0/1 | G2/3 |

So far, we have the information about four switch devices 1, 110, 120 and 113.

The process continues for switch device 8, i.e., the request frame which switch device 113 sends out from port G2/3 towards Node-H 17 is received by switch device 8 which checks the EtherType field of the request frame indication that it is a "Request". The process is then similar to previously described procedure performed by switch devices 1, 110, 120, and 113.

Switch device 8 sends the request frame out from its outgoing port interface (F1/4) towards Node-H 17 and switch device 8 generates reply frames, and as previously described the hop number of one frame is increased by 1 by each switch device along the path between the Node-H 17 and Node-A 10. So the hop number will be equal to 5. When Node-A 10 receives the reply frames, it collects or fetches the information and the result is shown below:

| Hop Number | Switch ID | Switch name | Incoming interface | Outgoing Interface |
|---|---|---|---|---|
| 5 | 8 | SW8-R400 | G1/2 | F1/4 |

The output at Node-A 10 for the five switch devices 1, 110, 120, 113 and 8 is shown below:

| Output | | | | |
|---|---|---|---|---|
| Source MAC address AA:AA:AA:AA:AA:AA | | | Destination MAC address HH:HH:HH:HH:HH:HH | |
| Hop Number | Switch ID | Switch name | Incoming interface | Outgoing Interface |
| 1 | 1 | SW1-R100 | F1/3 | G1/2 |
| 2 | 110 | SW110-R100 | G2/3 | T1/0/1 |
| 3 | 120 | SW120-R200 | T1/1/2 | T1/1/4 |
| 4 | 113 | SW113-R400 | T1/0/1 | G2/3 |
| 5 | 8 | SW8-R400 | G1/2 | F1/4 |

It should be mentioned that switch device 8 to which Node-H 17 is connected, also has sent the request frame out from port F1/4 as described above. However in this case, Node-H 17 checks the EtherType field, but Node-H 17 will ignore the request frame or will drop the request frame.

There are several advantages achieved by the described solution. An advantage is that the information on the path between the source host node and the destination host node is determined. No need to login into each switch device. Also, no need to run additional commands on the network switch devices. There is also no change in the size the structure of the standard frame, and there is no need for additional hardware on switch devices. Further, less consumption of resources is used since the method used does not require login into each switch device for tracing the route between a source host node and a destination host node. The process described may be performed by an ASIC chip on switch devices, which means there is no overhead or delays. Also, not only the switch IDs, switch names and their hop number is determined but also the incoming and outgoing port information as shown in the output table above. ASIC stands for Application Specific Integrated Circuit which is an integrated circuit chip.

Figure 2:
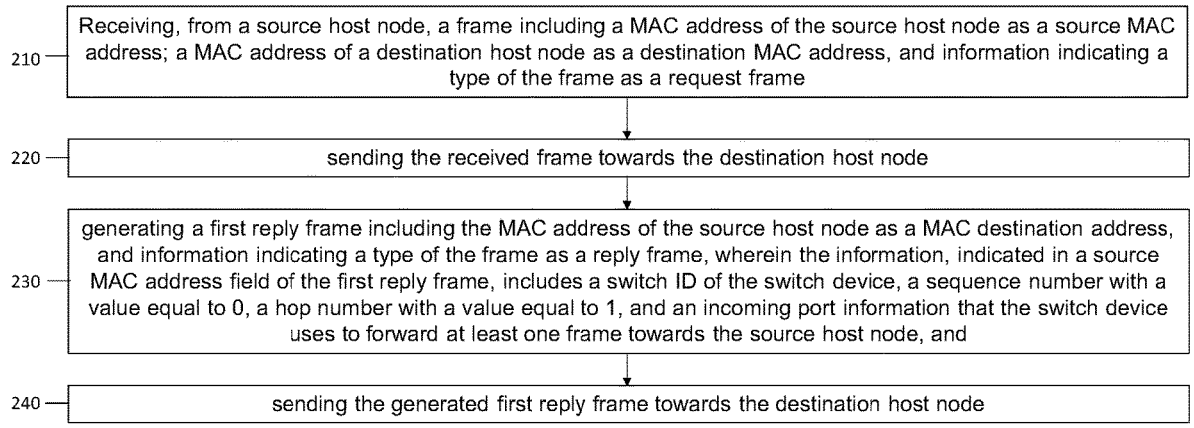
FIG. 2 illustrates a flowchart of a method performed by a switch device according to some embodiments herein.

Referring to FIG. 2, there is illustrated a flowchart that summarizes the method performed by a switch device (e.g., switch device 1) in accordance with the previously described embodiments:

As shown, the main steps comprise:

(210), receiving from a source host node Node-A 10, a frame including a MAC address of the source host node Node-A 10 as a source MAC address; a MAC address of a destination host node Node-H 17 as a destination MAC address, and information indicating a type of the frame as a request frame;

(220) sending the received frame towards the destination host node Node-H 17;

(230) generating a first reply frame including the MAC address of the source host node Node-A 10 as a MAC destination address, and information indicating a type of the frame as a reply frame, wherein the information, indicated in a source MAC address field of the first reply frame, includes a switch ID of the switch device 1, a sequence number with a value equal to 0, a hop number with a value equal to 1, and an incoming port information that the switch device uses to forward at least one frame towards the source host node Node-A 10, and (240) sending the generated first reply frame towards the source host node Node-A 10.

According to an embodiment, the method performed by the switch device further comprises: generating a second reply frame including the MAC address of the source host node Node-A 10 as a MAC destination address, information including the switch ID, the sequence number which is increased by 1, and an outgoing port information that the switch device uses to forward at least one frame towards the destination host node, and sending the generated second reply frame towards the source host node Node-A 10.

The method further comprises, generating a third reply frame including the MAC address of the source host node Node-A 10 as a MAC destination address, information including the switch ID, the sequence number which is further increased by 1, and information associated with a name of the switch device, and sending the generated third reply frame towards the source host node Node-A 10.

The method further comprises if a number of characters associated with the name of the switch device 1 is larger than a predetermined number of characters, generating another reply frame (e.g., a fourth reply frame) including the MAC address of the source host node Node-A 10 as a MAC destination address, information including the switch ID, the sequence number which is further increased by 1, and the information associated with the name of the switch device 1, and sending said another reply frame towards the source host node Node-A 10.

The method further comprises, receiving from another switch device (e.g. switch device 110) a reply frame including the MAC address of the source host node Node-A 10 as a MAC destination address, and information indicating a type of the frame as a reply frame, wherein the information includes a switch ID of said another switch device 110, a sequence number; and wherein if the sequence number is equal to 0, increasing a hop number indicated in the reply frame by 1; and sending the reply frame towards the source host node 10.

The method further comprises, receiving from said another switch device 110 a reply frame including the MAC address of the source host node Node-A 10 as a MAC destination address, information including the switch ID of said another switch device 110, the sequence number which is larger than 0, and sending the reply frame towards the source host node 10.

Additional actions performed by the switch device have already been described.

Figure 3:
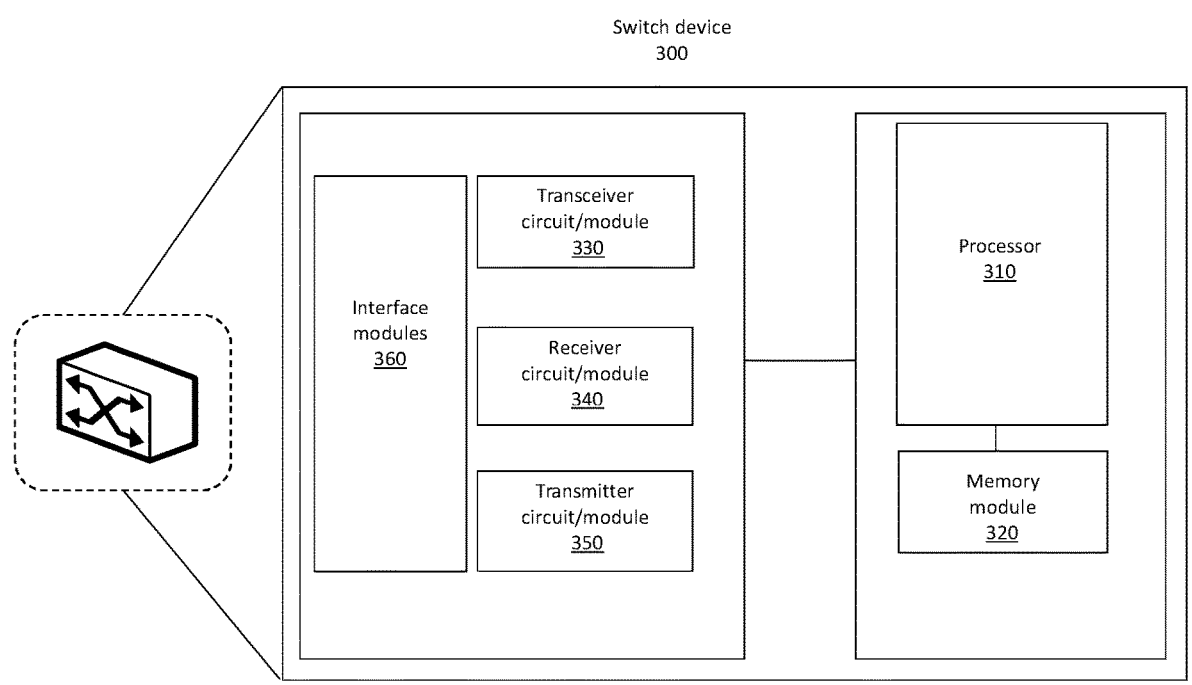
FIG. 3 illustrates a block diagram of switch device according to some embodiments herein.

To perform the method described above, a switch device 300 (e.g., switch device 1) is provided as depicted in FIG. 3. The switch device 300 comprises a processing circuit or a processing module or a processor 310; a memory module 320; a receiver circuit or receiver module 340; a transmitter circuit or transmitted module 350; and a transceiver circuit or transceiver module 330 which may include the transmitter circuit 350 and the receiver circuit 340. The switch device 300 may be a wireless switch or fix switch device that can be connected through cables to hosts and to other network devices. The switch device 300 is also shown provided with an interface module 360 which includes interface ports etc.

The processing module/circuit 310 includes a processor, microprocessor, an application specific integrated circuit (ASIC), field programmable gate array (FPGA), or the like, and may be referred to as the "processor 310." The processor 310 controls the operation of the switch device 300 and its components. Memory (circuit or module) 320 includes a random access memory (RAM), a read only memory (ROM), and/or another type of memory to store data and instructions that may be used by processor 310. In general, it will be understood that the switch device 300 in one or more embodiments includes fixed or programmed circuitry that is configured to carry out the operations in any of the embodiments disclosed herein.

The processor 310 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 310 to carry out the operations of the switch device 300 disclosed herein. Further, it will be appreciated that the switch device 300 may comprise additional components not shown in FIG. 3.

The switch device 300 is, according to previously described embodiments, configured to:
 receive from a source host node Node-A 10, frame including a MAC address of the source host node Node-A 10 as a source MAC address; a MAC address of a destination host node Node-H 17 as a destination MAC address, and information indicating a type of the frame as a request frame;
 send the received frame towards the destination host node Node-H 17;
 generate a first reply frame including the MAC address of the source host node Node-A 10 as a MAC destination address, and information indicating a type of the frame as a reply frame, wherein the information, indicated in a source MAC address field of the first reply frame, includes a switch ID of the switch device 300, a sequence number with a value equal to 0, a hop number with a value equal to 1, and an incoming port information that the switch device uses to forward at least one frame towards the source host node Node-A 10, and
 send the generated first reply frame towards the source host node Node-A 10.

According to an embodiment, the switch device 300 is further configured to:
 generate a second reply frame including the MAC address of the source host node Node-A 10 as a MAC destination address, information including the switch ID, the sequence number which is increased by 1, and an outgoing port information that the switch device uses to forward at least one frame towards the destination host node, and send the generated second reply frame towards the source host node Node-A 10.

According to an embodiment, the switch device 300 is configured to generate a third reply frame including the MAC address of the source host node Node-A 10 as a MAC destination address, information including the switch ID, the sequence number which is further increased by 1, and information associated with a name of the switch device, and send the generated third reply frame towards the source host node Node-A 10.

According to an embodiment, if a number of characters associated with the name of the switch device 1 is larger than a predetermined number of characters, the switch device 300 is configured to generate another reply frame (e.g., a fourth reply frame) including the MAC address of the source host node Node-A 10 as a MAC destination address, information including the switch ID, the sequence number which is further increased by 1, and the information associated with the name of the switch device 300, and send said another reply frame towards the source host node Node-A 10.

The switch device 300 is further configured to receive from another switch device (e.g., switch device 110) a reply frame including the MAC address of the source host node Node-A 10 as a MAC destination address, and information indicating a type of the frame as a reply frame, wherein the information includes a switch ID of said another switch device 110, a sequence number; and wherein if the sequence number is equal to 0, increase a hop number indicated in the reply frame by 1; and send the reply frame towards the source host node 10.

The switch device 300 is further configured to receive from said another switch device 110 a reply frame including the MAC address of the source host node Node-A 10 as a MAC destination address, information including the switch ID of said another switch device 110, the sequence number which is larger than 0, and send the reply frame towards the source host node 10.

Additional actions or operations performed by the switch device have already been described in detail and need not be repeated.

There is also provided a computer program comprising instructions which when executed on at least one processor 310 of the switch device 300 according to embodiments herein, cause the at least one processor 310 to carry out the method previously described. Also a carrier containing the computer program is provided, wherein the carrier is one of a computer readable storage medium; an electronic signal, optical signal, or a radio signal.

Figure 4:
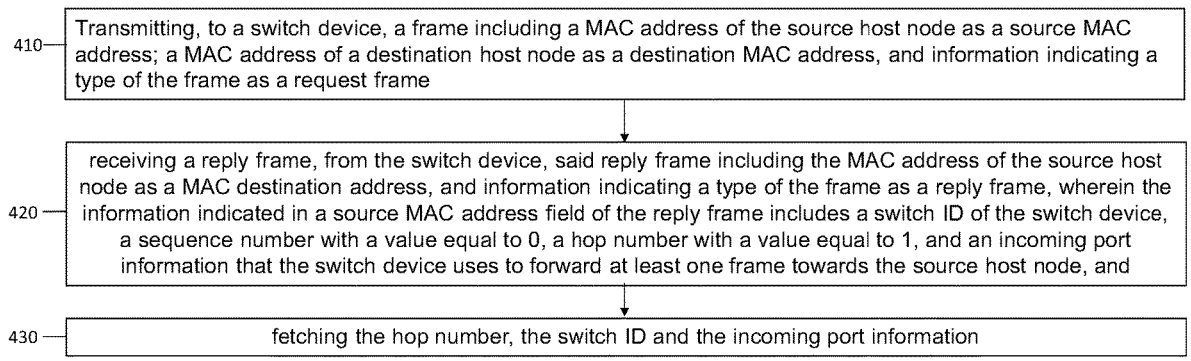
FIG. 4 illustrates a flowchart of a method performed by a host node according to some embodiments herein.

Referring to FIG. 4, there is illustrated a flowchart that summarizes the method performed by source host node (e.g., Node-A 10) in a network comprising a plurality of switch devices, in accordance with the previously described embodiments.

As shown, the main steps comprise:

(410) transmitting, to a switch device (e.g., switch device 1), a frame including a MAC address of the source host node Node-A 10 as a source MAC address; a MAC address of a destination host node Node-H 17 as a destination MAC address, and information indicating a type of the frame as a request frame;

(420) receiving a reply frame, from the switch device 1, said reply frame including the MAC address of the source host node Node-A 10 as a MAC destination address, and information indicating a type of the frame as a reply frame, wherein the information indicated in a source MAC address field of the reply frame includes a switch ID of the switch device 1, a sequence number with a value equal to 0, a hop number with a value equal to 1, and an incoming port information that the switch device 1 uses to forward at least one frame towards the source host node Node-A 10; and (430) fetching the hop number, the switch ID and the incoming port information.

The method performed by the source host node Node-A 10 further comprises: receiving, from the switch device 1, another reply frame including the MAC address of the source host node Node-A 10 as a MAC destination address, information including the switch ID, a sequence number which if it is equal to 1, the information further includes an outgoing port information that the switch device 1 uses to forward at least one frame towards the destination host node Node-H 17; and fetching the outgoing port information.

The method performed by the source host node Node-A 10 further comprises, receiving another reply frame including the MAC address of the source host node Node-A 10 as a MAC destination address, information including the switch ID, a sequence number which if it is larger than 1 (i.e. equal to 2), the information further includes an information associated with a name of the switch device 1; and fetching the information associated with the name of the switch device 1.

The method further comprises, if a number of characters associated with the name of the switch device 1 is larger than a predetermined number of characters, receiving yet another reply frame including the MAC address of the source host node Node-A 10 as a MAC destination address, information including the switch ID, the sequence number which is larger than 1 (here sequence number is 3), and the information associated with the name of the switch device 1; and fetching the information associated with the name of the switch device 1.

The method performed by the source host node Node-A 10 further comprises, receiving, from another switch device 110 via the switch device 1, a reply frame including the MAC address of the source host node Node-A 10 as a MAC destination address, and information indicating a type of the frame as a reply frame, wherein the information includes a switch ID of said another switch device 110, a sequence number which if it is equal to 0, the information further includes a hop number and an incoming port information that said another switch device 110 uses to forward at least one frame towards the source host node Node-A 10; and fetching the hop number, the switch ID of said another switch device 110 and the incoming port information that said another switch device 110 uses to forward at least one frame towards the source host node Node-A 10.

The method performed by the source host node Node-A 10 further comprises, receiving, from said another switch device 110 via the switch device 1, another reply frame including the MAC address of the source host node Node-A 10 as a MAC destination address, information including the switch ID of said another switch device 110, a sequence number which if it is equal to 1, the information further includes an outgoing port information that said another switch device 110 uses to forward frames towards the destination host node Node-H 17; and fetching the outgoing port information that said another switch device 110 uses to forward frames towards the destination host node Node-H 17.

The method further comprises, receiving from said another switch device 110 via the switch device 1, another reply frame including the MAC address of the source host node Node-A 10 as a MAC destination address, a sequence number which if it is larger than 1 (i.e., equal to 2), the information includes information associated with a name of said another switch device 110; and fetching the information associated with the name of said another switch device 110.

The method further comprises, if a number of characters associated with the name of said another switch device 110 is larger than a predetermined number of characters, receiving from said another switch device 110 via the switch device 1, yet another reply frame including the MAC address of the source host node Node-A 10 as a MAC destination address, information including the switch ID of said another switch device 110, the sequence number which is larger than 1, and the information associated with the name of said another switch device 110; and fetching the information associated with the name of said another switch device 110.

Additional operations or actions performed by the source host node Node-A 10 have already been described.

Figure 5:
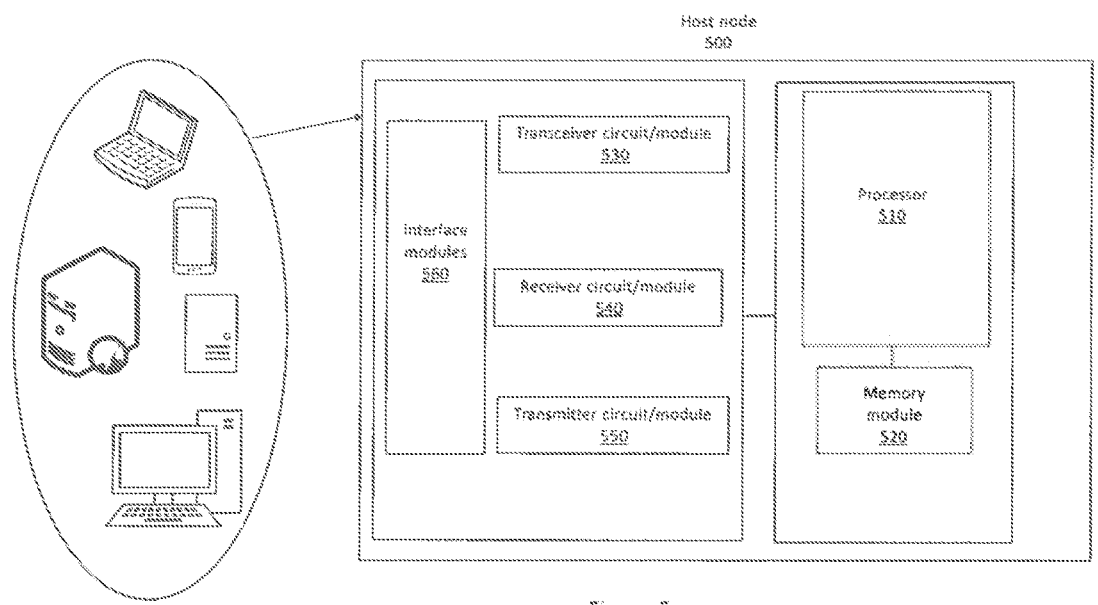
FIG. 5 illustrates a block diagram of host node according to some embodiments herein.

To perform the method described above, a host node 500 (e.g., Node-A 10) is provided as depicted in FIG. 5. The host node 500 comprises a processing circuit or a processing module or a processor 510; a memory module 520; a receiver circuit or receiver module 540; a transmitter circuit or transmitted module 550; and a transceiver circuit or transceiver module 530 which may include the transmitter circuit 550 and the receiver circuit 540. The host node 500 is also shown provided with an interface module 560 which includes interface ports etc. The host node 500 may be a computer, a laptop, a server, a mobile phone or a user equipment, etc.

The processing module/circuit 510 includes a processor, microprocessor, an application specific integrated circuit (ASIC), field programmable gate array (FPGA), or the like, and may be referred to as the "processor 510." The processor 510 controls the operation of the host node 500 and its components. Memory (circuit or module) 520 includes a random access memory (RAM), a read only memory (ROM), and/or another type of memory to store data and instructions that may be used by processor 510. In general, it will be understood that the host node 500 in one or more embodiments includes fixed or programmed circuitry that is configured to carry out the operations in any of the embodiments disclosed herein.

The processor 510 configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 510 to carry out the operations of the host node 500 disclosed herein. Further, it will be appreciated that the host node 500 may comprise additional components not shown in FIG. 5.

In according with embodiments herein, the (source) host node 500 by means of processor 510 is configured to:

- transmit, to a switch device (e.g., switch device 1), a frame including a MAC address of the source host node 500 as a source MAC address; a MAC address of a destination host node Node-H 17 as a destination MAC address, and information indicating a type of the frame as a request frame;
- receive a reply frame, from the switch device 1, said reply frame including the MAC address of the source host node 500 as a MAC destination address, and information indicating a type of the frame as a reply frame, wherein the information indicated in a source MAC address field of the reply frame includes a switch ID of the switch device 1, a sequence number with a value equal to 0, a hop number with a value equal to 1, and an incoming port information that the switch device 1 uses to forward at least one frame towards the source host node 500; and
- fetch the hop number, the switch ID and the incoming port information.

The source host node 500 is further configured to: receive, from the switch device 1, another reply frame including the MAC address of the source host node 500 as a MAC destination address, information including the switch ID, a sequence number which if it is equal to 1, the information further includes an outgoing port information that the switch device 1 uses to forward at least one frame towards the destination host node Node-H 17; and fetch the outgoing port information.

The source host node 500 is further configured to: receive another reply frame including the MAC address of the source host node 500 as a MAC destination address, information including the switch ID, a sequence number which if it is larger than 1 (i.e., equal to 2), the information further includes an information associated with a name of the switch device 1; and fetching the information associated with the name of the switch device 1.

The source host node 500 is further configured to: if a number of characters associated with the name of the switch device 1 is larger than a predetermined number of characters, receiving yet another reply frame including the MAC address of the source host node 500 as a MAC destination address, information including the switch ID, the sequence number which is larger than 1, and the information associated with the name of the switch device 1; and fetching the information associated with the name of the switch device 1.

The source host node 100 is further configured to: receive, from another switch device 110 via the switch device 1, a reply frame including the MAC address of the source host node 500 as a MAC destination address, and information indicating a type of the frame as a reply frame, wherein the information includes a switch ID of said another switch device 110, a sequence number which if it is equal to 0, the information further includes a hop number and an incoming port information that said another switch device 110 uses to forward at least one frame towards the source host node Node-A 10; and fetch the hop number, the switch ID of said another switch device 110 and the incoming port information that said another switch device 110 uses to forward at least one frame towards the source host node 500.

The source host node 500 is further configured to: receive, from said another switch device 110 via the switch device 1, another reply frame including the MAC address of the source host node 500 as a MAC destination address, information including the switch ID of said another switch device 110, a sequence number which if it is equal to 1, the information further includes an outgoing port information that said another switch device 110 uses to forward frames towards the destination host node Node-H 17; and fetch the outgoing port information that said another switch device 110 uses to forward frames towards the destination host node Node-H 17.

The source host node 500 is further configured to: receive from said another switch device 110 via the switch device 1, another reply frame including the MAC address of the source host node 500 as a MAC destination address, a sequence number which if it is larger than 1 (i.e. equal to 2), the information includes information associated with a name of said another switch device 110; and fetch the information associated with the name of said another switch device 110.

The source host node 500 is further configured to: if a number of characters associated with the name of said another switch device 110 is larger than a predetermined number of characters, receiving from said another switch device 110 via the switch device 1, yet another reply frame including the MAC address of the source host node 500 as a MAC destination address, information including the switch ID of said another switch device 110, the sequence number which is larger than 1, and the information associated with the name of said another switch device 110; and fetch the information associated with the name of said another switch device 110.

Additional actions or operations performed by the host node 500 (or Node-A 10) have already been described in detail and need not be repeated.

There is also provided a computer program comprising instructions which when executed on at least one processor 510 of the host node 500 according to embodiments herein, cause the at least one processor 510 to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method performed by a switch device in a network comprising a plurality of switch devices, the method comprising:
   - receiving, from a source host node, a frame including a Medium Access Control (MAC) address of the source host node as a source MAC address, a MAC address of a destination host node as a destination MAC address, and information indicating a type of the frame as a request frame;
   - sending the received frame towards the destination host node;
   - generating a first reply frame including the MAC address of the source host node as a MAC destination address, and information indicating a type of the frame as a reply frame, wherein the information, indicated in a source MAC address field of the first reply frame, includes a switch ID of the switch device, a sequence number with a value equal to 0, a hop number with a value equal to 1, and incoming port information that the switch device uses to forward at least one frame towards the source host node;
sending the generated first reply frame towards the source host node; and
receiving from another switch device a reply frame including the MAC address of the source host node as a MAC destination address, and information indicating a type of the frame as a reply frame, wherein the information includes a switch ID of said another switch device, a sequence number, and wherein if the sequence number is equal to 0, further comprising increasing a hop number indicated in the reply frame by 1, and sending the reply frame towards the source host node.

2. The method according to claim 1, further comprising, generating a second reply frame including the MAC address of the source host node as a MAC destination address, information including the switch ID, the sequence number, which is increased by 1, and an outgoing port information that the switch device uses to forward at least one frame towards the destination host node, and sending the generated second reply frame towards the source host node.

3. The method according to claim 2, further comprising, generating a third reply frame including the MAC address of the source host node as a MAC destination address, information including the switch ID, the sequence number, which is further increased by 1, and information associated with a name of the switch device, and sending the generated third reply frame towards the source host node.

4. The method according to claim 3, wherein, if a number of characters associated with the name of the switch device is larger than a predetermined number of characters, further comprising generating another reply frame including the MAC address of the source host node as a MAC destination address, information including the switch ID, the sequence number which is further increased by 1, and the information associated with the name of the switch device, and sending said another reply frame towards the source host node.

5. The method according to claim 1, further comprising, receiving from said another switch device a reply frame including the MAC address of the source host node as a MAC destination address, information including the switch ID of said another switch device, the sequence number, which is larger than 0, and sending the reply frame towards the source host node.

6. A method performed by a source host node in a network comprising a plurality of switch devices, the method comprising:
transmitting, to a switch device, a frame including a MAC address of the source host node as a source MAC address; a MAC address of a destination host node as a destination MAC address, and information indicating a type of the frame as a request frame;
receiving a reply frame, from the switch device, said reply frame including the MAC address of the source host node as a MAC destination address, and information indicating a type of the frame as a reply frame, wherein the information indicated in a source MAC address field of the reply frame includes a switch ID of the switch device, a sequence number with a value equal to 0, a hop number with a value equal to 1, and an incoming port information that the switch device uses to forward at least one frame towards the source host node;
fetching the hop number, the switch ID and the incoming port information;
receiving, from another switch device via the switch device, a reply frame including the MAC address of the source host node as a MAC destination address, and information indicating a type of the frame as a reply frame, wherein the information includes a switch ID of said another switch device, a sequence number which if it is equal to 0, the information further includes a hop number and an incoming port information that said another switch device uses to forward at least one frame towards the source host node; and
fetching the hop number, the switch ID of said another switch device and the incoming port information that said another switch device uses to forward at least one frame towards the source host node.

7. The method according to claim 6, further comprising:
receiving, from the switch device, another reply frame including the MAC address of the source host node as a MAC destination address, information including the switch ID, a sequence number which if it is equal to 1, the information further includes outgoing port information that the switch device uses to forward at least one frame towards the destination host node; and
fetching the outgoing port information.

8. The method according to claim 7, further comprising:
receiving another reply frame including the MAC address of the source host node as a MAC destination address, information including the switch ID, a sequence number which if it is larger than 1, the information further includes an information associated with a name of the switch device; and
fetching the information associated with the name of the switch device.

9. The method according to claim 8, further comprising, if a number of characters associated with the name of the switch device is larger than a predetermined number of characters, receiving yet another reply frame including the MAC address of the source host node as a MAC destination address, information including the switch ID, the sequence number which is larger than 1, and the information associated with the name of the switch device; and fetching the information associated with the name of the switch device.

10. The method according to claim 6, further comprising:
receiving, from said another switch device via the switch device, another reply frame including the MAC address of the source host node as a MAC destination address, information including the switch ID of said another switch device, a sequence number which if it is equal to 1, the information further includes an outgoing port information that said another switch device uses to forward frames towards the destination host node; and
fetching the outgoing port information that said another switch device uses to forward frames towards the destination host node.

11. The method according to claim 10, further comprising:
receiving from said another switch device via the switch device, another reply frame including the MAC address of the source host node as a MAC destination address, a sequence number which if it is larger than 1, the information includes information associated with a name of said another switch device; and
fetching the information associated with the name of said another switch device.

12. The method according to claim 11, wherein if a number of characters associated with the name of said another switch device is larger than a predetermined number of characters, further comprising receiving from said another switch device via the switch device, yet another reply frame including the MAC address of the source host node as a MAC destination address, information including the switch ID of said another switch device, the sequence number which is larger than 1, and the information associated with the name of said another switch device; and fetching the information associated with the name of said another switch device.

13. A switch device in a network comprising a plurality of switch devices, the switch device comprising a processor and a memory containing instructions executable by the processor wherein the switch device is configured:

receive, from a source host node, a frame including a Medium Access Control (MAC) address of the source host node as a source MAC address; a MAC address of a destination host node as a destination MAC address, and information indicating a type of the frame as a request frame;

send the received frame towards the destination host node;

generate a first reply frame including the MAC address of the source host node as a MAC destination address, and information indicating a type of the frame as a reply frame, wherein the information, indicated in a source MAC address field of the first reply frame, includes a switch ID of the switch device, a sequence number with a value equal to 0, a hop number with a value equal to 1, and an incoming port information that the switch device uses to forward at least one frame towards the source host node; and send the generated first reply frame towards the source host node; and receive from another switch device a reply frame including the MAC address of the source host node as a MAC destination address, and information indicating a type of the frame as a reply frame, wherein the information includes a switch ID of said another switch device, a sequence number, and wherein if the sequence number is equal to 0, further comprising increasing a hop number indicated in the reply frame by 1, and sending the reply frame towards the source host node.

14. A host node in a network comprising a plurality of switch devices, the host node comprising a processor and a memory containing instructions executable by the processor wherein the host node is configured to:

transmit, to a switch device, a frame including a MAC address of the source host node as a source MAC address; a MAC address of a destination host node as a destination MAC address, and information indicating a type of the frame as a request frame;

receive a reply frame, from the switch device, said reply frame including the MAC address of the source host node as a MAC destination address, and information indicating a type of the frame as a reply frame, wherein the information indicated in a source MAC address field of the reply frame includes a switch ID of the switch device, a sequence number with a value equal to 0, a hop number with a value equal to 1, and an incoming port information that the switch device uses to forward at least one frame towards the source host node;

fetch the hop number, the switch ID and the incoming port information;

receive, from another switch device via the switch device, a reply frame including the MAC address of the source host node as a MAC destination address, and information indicating a type of the frame as a reply frame, wherein the information includes a switch ID of said another switch device, a sequence number which if it is equal to 0, the information further includes a hop number and an incoming port information that said another switch device uses to forward at least one frame towards the source host node; and fetch the hop number, the switch ID of said another switch device and the incoming port information that said another switch device uses to forward at least one frame towards the source host node.

* * * * *